Feb. 17, 1970    W. E. CURRIE    3,495,855
CLAMP-TYPE HOSE COUPLING
Filed Nov. 17, 1967    2 Sheets-Sheet 2
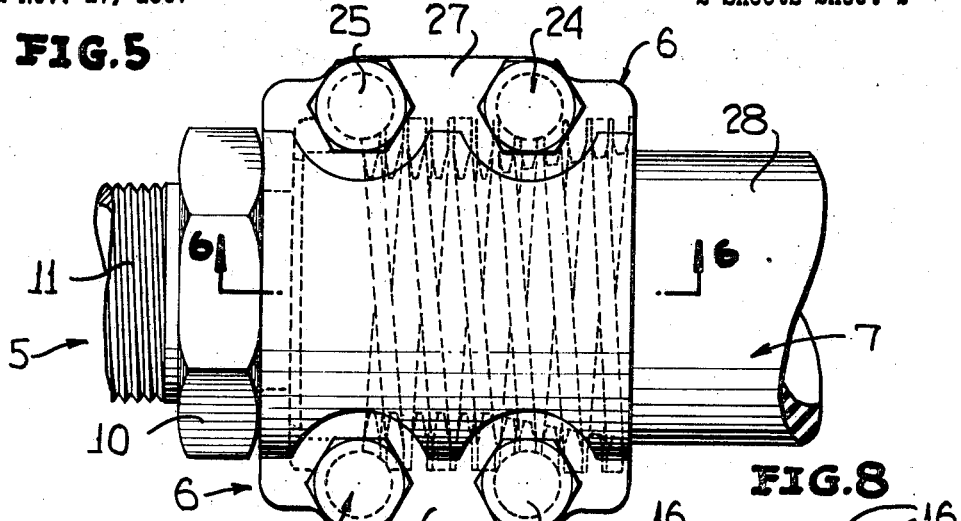
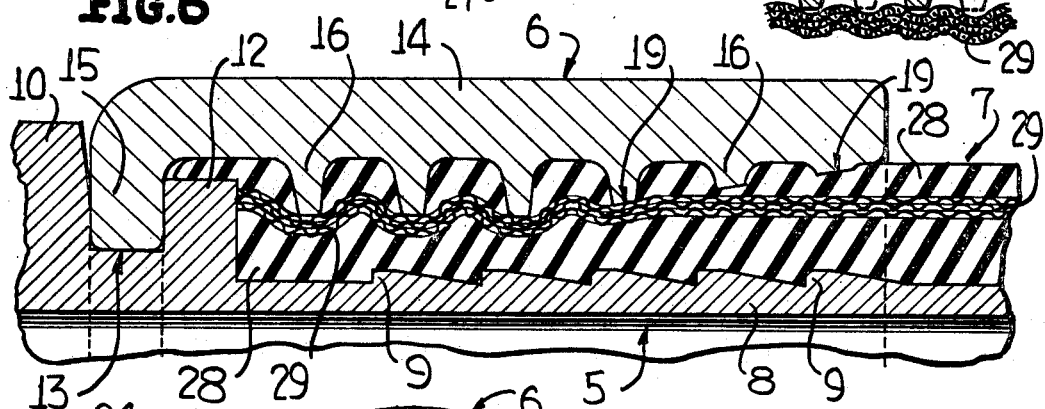
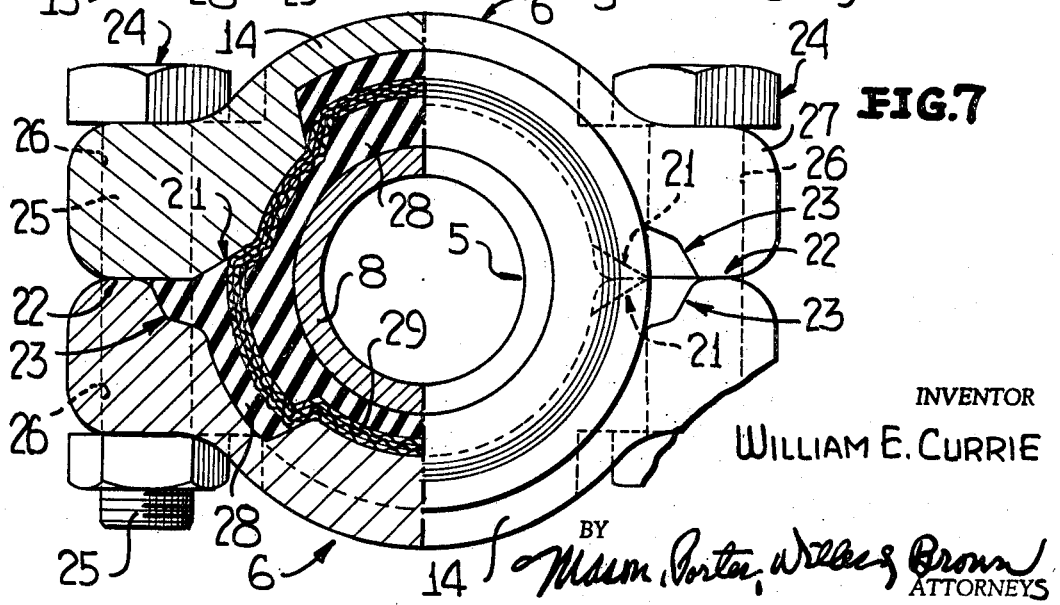
INVENTOR
WILLIAM E. CURRIE
BY
ATTORNEYS United States Patent Office 3,495,855
Patented Feb. 17, 1970

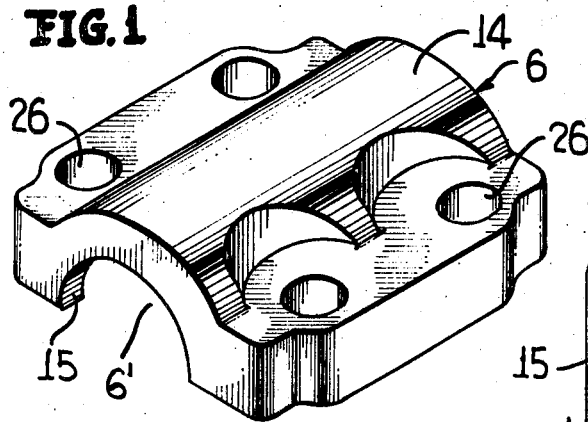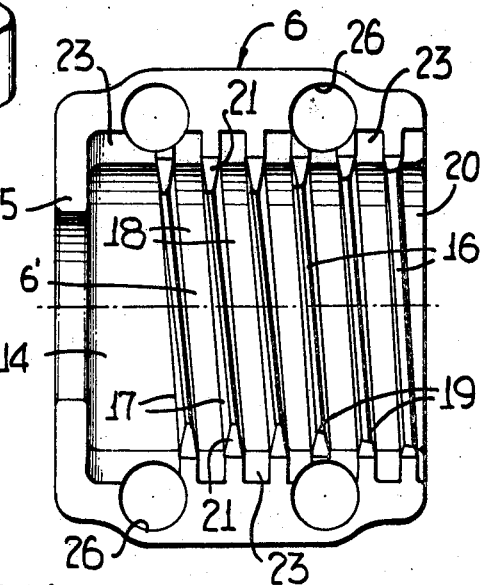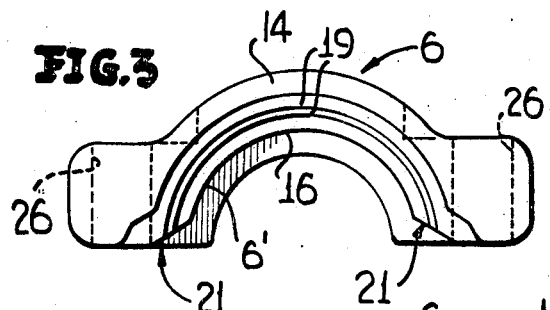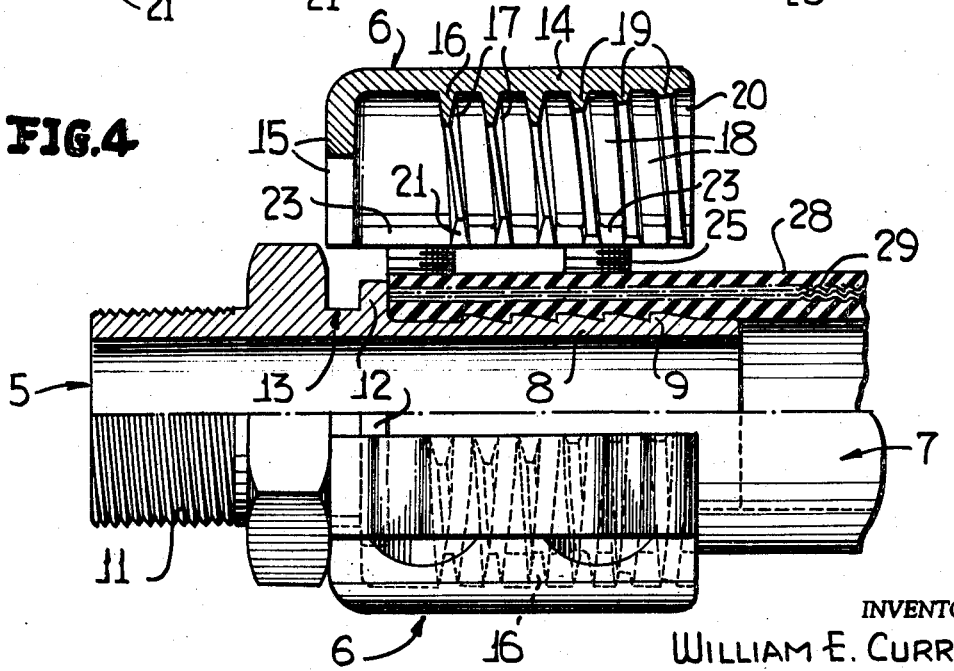
INVENTOR
WILLIAM E. CURRIE

3,495,855
CLAMP-TYPE HOSE COUPLING
William E. Currie, Cleveland Heights, Ohio, assignor to Parker-Hannifin Corporation, Cleveland, Ohio, a corporation of Ohio
Filed Nov. 17, 1967, Ser. No. 683,968
Int. Cl. F16l *33/00, 31/00, 47/00, 49/00*
U.S. Cl. 285—253          11 Claims

ABSTRACT OF THE DISCLOSURE

A clamp-type hose coupling comprising a nipple insertable into a hose and two opposed identical clamping blocks to clamp the hose against the nipple, the blocks having longitudinally spaced ribs for gripping the hose, the ends of each rib at the parting faces of one block lying opposite spaces between rib ends at parting faces of the other block. The ends of the ribs and the spaces therebetween at the parting faces are chamfered to provide clearances into which portions of the hose may be deformed to prevent pinching thereof.

---

Objects of the invention are to provide a split clamp block type hose coupling in which (a) the two blocks are identical, (b) pinching of the hose at the parting faces of the blocks is avoided, (c) there is a simple means to determine when the blocks are properly tightened on the hose, and (d) the blocks are of minimum size.

These objects are respectively achieved by providing (a) hose-holding helical ribs in the block with the rib ends at the parting faces of one block being opposite spaces between rib ends at the opposing parting faces of the other block, (b) making the ribs narrower than the spaces between the ribs and chamfering both the rib ends and such spaces at the parting faces, (c) providing for abutment of the blocks at their parting faces, and (d) overlapping the bolt holes with the ribs.

Other objects will be apparent from the following description and the drawings in which:

FIGURE 1 is a prospective view illustrating one of the clamping blocks.

FIGURE 2 is an elevational view looking at the interior of the clamping block of FIGURE 1.

FIGURE 3 is an end elevation of a clamp block.

FIGURE 4 is partly a longitudinal sectional view and partly a side elevation, the nipple being inserted in the hose, one clamp block being against the hose and the other clamp block being shown spaced from the hose.

FIGURE 5 is a plan view of an assembled coupling with the ribs and both clamp blocks shown by dotted lines.

FIGURE 6 is an enlarged fragmentary longitudinal sectional view taken on the line 6—6 of FIGURE 5.

FIGURE 7 is partly a vertical cross-section and partly an end elevation of the assembled coupling.

FIGURE 8 is a fragmentary partially schematic longitudinal sectional view showing how the reinforcement of a hose is gripped by the ribs, with the rib ends at the parting face of one block being shown in solid lines and the rib ends at the parting face of the other block being shown by dotted lines.

The hose coupling comprises a nipple 5 and two identical clamp blocks 6 for gripping a hose 7. The latter may have an elastomeric body 28 and a wire reinforcement 29 but the coupling may also be used with other types of hose that may or may not have reinforcement.

Nipple 5 includes a tubular body 8 insertable in the hose and having annual ribs 9 and an enlargement 10 spaced from a flange 12 to provide an annular groove 13 therebetween.

Each block 6 has a semi-circular recess 6' therein between flanges 27 that provide parting faces 22. Each recess has a series of longitudinally spaced helical ribs 16 whose ends adjacent to the parting faces 22 of the corresponding block are chamfered as at 21. Spaces 18 between the ribs are wider than the thicknesses of the ribs and are likewise chamfered at 23 adjacent the parting faces 22. The outermost ribs 16 progressively decrease in depth as at 19 to provide a progressively increasing grip upon the hose.

Ribs 16 preferably have a pitch such that for each 180° of revolution each rib advances axially a distance at least as great, and preferably greater than, the thickness of the rib. In effect, ribs 16 in each block are the remainder of a procedure equivalent to placing two blocks together, cutting a double-lead thread therein, then in one block removing every other threat starting with the first and in the second block removing every other thread starting with the second. This results in the two blocks being identical but because of the thread pitch and the manner of removing every other thread from both blocks the remaining threads or ribs in one block will have their ends that are adjacent the parting faces lying opposite the spaces between the rib ends at the parting faces of the other block.

Because blocks 6 are identical only one mold need be made for producing the blocks of cast material and only one block part number be stocked as any two blocks can be used for making up one complete coupling.

With ribs 16 being narrower than the spaces between the ribs and the rib ends of one block being opposite spaces between rib ends of the other block at the parting faces, and also because the rib ends are chamfered at the parting faces, the rib ends at the parting faces of one block do not contact the rib ends at the parting faces of the other block. This provides space at the rib ends into which hose material may be deformed during the clamping action, thus avoiding pinching and shearing of the hose material.

The clamp blocks 6 are preferably designed to directly contact each other at their parting faces 22 when sufficiently tightened upon the hose. This makes it easy for the assembler to know when bolts 25 have been sufficiently tightened. However, in other forms of the invention the blocks may be formed so that the parting faces 22 of one block are slightly spaced from the parting faces of the other block when the desired clamping pressure has been applied. This provides for additional tightening in the event of cold flow of the hose material, as well as accommodating additional variation in hose dimensions.

During assembling of the coupling, flanges 15 of clamp blocks 6 enter groove 13 between flange 12 and enlargement 10 to properly locate the clamp blocks longitudinally relative to nipple 5.

In another contemplated form of the invention, ribs 16 may be annular and still have the rib ends in one block opposite spaces between rib ends of the other block and with the rib ends and spaces being changed chamfered at the parting faces. This modification permits ready clamping of the hose without pinching the same at the parting faces but because the ribs are annular the blocks will not be identical.

While several forms of the invention are herein disclosed, other modifications of the parts may be made within the scope of the invention as defined in the claims.

I claim:
1. A hose coupling comprising a tubular nipple insertable into a hose, a pair of clamp blocks each having a semi-circular recess, said blocks having opposed parting faces adjacent said recesses and conjointly encircling the nipple in spaced relation thereto for clamping a hose on the nipple when the nipple has been inserted into the hose, means for securing the blocks to each other in their hose clamping relation, said recesses having therein inwardly directed longitudinally spaced ribs that grip the hose, the rib ends in one block lying opposite spaces between rib ends in the other block at the parting faces, the blocks being identical, the axial length of the spaces between adjacent rib bases on each block being materially wider than the base thickness of the ribs on the other block, said ribs each being generally in the form of a single helical lead thread having a pitch corresponding to that of a double lead thread, and a plane through one of the ribs of one of the blocks crosses a plane through an adjacent rib of the other of the blocks.

2. The hose coupling as defined in claim 1 wherein said ribs have chamfered end portions adjacent said parting faces to provide spaces into which hose portions may bulge to avoid shearing thereof.

3. The hose clamp as defined in claim 1 wherein at least a part of the ribs are on one block terminating short of the parting face of that block.

4. The hose clamp as defined in claim 1 wherein the nipple and the blocks are equipped with interlocking flange and groove means effective to hold the blocks and nipple against relative longitudinal movement.

5. The hose clamp as defined in claim 1 wherein said securing means comprises apertures through the blocks and bolts passing through cooperating apertures.

6. The hose clamp as defined in claim 1 wherein said securing means comprises apertures through the blocks and bolts passing through cooperating apertures, and the apertures overlap said ribs for minimizing the over-all width of the blocks.

7. The hose clamp as defined in claim 1 wherein said ribs include chamfered end portions adjacent said parting faces to provide spaces into which hose portions may bulge to avoid shearing thereof, and at least a part of the ribs are on one block terminating short of the parting face of that block.

8. The hose clamp as defined in claim 1 wherein at least a part of the ribs are on one block terminating short of the parting face of that block, and said nipple and blocks are equipped with interengaging flange and groove means effective to hold the blocks and nipple against relative longitudinal movement.

9. The hose clamp as defined in claim 1 wherein said ribs have chamfered end portions adjacent said parting faces to provide spaces into which hose portions may bulge to avoid shearing thereof, and said nipple and blocks being equipped with interengaging flange and groove means effective to hold the blocks and nipple against relative longitudinal movement.

10. The hose clamp as defined in claim 1 wherein said ribs have chamfered end portions adjacent said parting faces to provide spaces into which hose portions may bulge to avoid shearing thereof, at least a part of the ribs on one block terminating short of the parting face of that block, and the nipple and blocks being equipped with interengaging flange and groove means effective to hold the blocks and nipple against relative longitudinal movement.

11. The hose clamp as defined in claim 1 wherein said ribs have chamfered end portions adjacent said parting faces to provide spaces into which hose portions may bulge to avoid shearing thereof, at least a part of the ribs are on one block terminating short of the parting face of that block, the nipple and blocks being equipped with interengaging flange and groove means effective to hold the blocks and nipple against relative longitudinal movement, said securing means comprising apertures through the block and bolts passing through cooperating apertures, and the apertures overlapping said ribs in a manner for minimizing the over-all width of the blocks.

References Cited

UNITED STATES PATENTS

| | | | |
|---|---|---|---|
| 1,587,327 | 6/1926 | Johnson | 285—253 X |
| 2,166,524 | 7/1939 | Goodall | 285—253 X |
| 3,142,503 | 7/1964 | Stranberg et al. | 285—243 |
| 3,181,900 | 5/1965 | Hayward | 285—243 |
| 3,249,371 | 5/1966 | Peterman | 285—253 |
| 3,257,132 | 6/1966 | Lyons | 285—253 |
| 3,367,683 | 2/1968 | Mattson | 285—243 |

FOREIGN PATENTS 1,031,810    3/1953    France.

THOMAS F. CALLAGHAN, Primary Examiner

U.S. Cl. X.R.

285—259